(12) United States Patent
Ward et al.

(10) Patent No.: US 9,696,043 B2
(45) Date of Patent: Jul. 4, 2017

(54) HOT WATER HEATER SYSTEMS AND METHODS FOR CONTROLLING ELECTRONIC MIXING VALVES

(71) Applicant: General Electric Company, Schenectady, NY (US)

(72) Inventors: Shaun Michael Ward, Louisville, KY (US); Jacob Gregory Powers, Brownstown, MI (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 357 days.

(21) Appl. No.: 14/641,495

(22) Filed: Mar. 9, 2015

(65) Prior Publication Data

US 2016/0266588 A1     Sep. 15, 2016

(51) Int. Cl.
    *F24D 19/10*     (2006.01)
    *G05D 23/13*     (2006.01)

(52) U.S. Cl.
    CPC ....... *F24D 19/1051* (2013.01); *G05D 23/134* (2013.01)

(58) Field of Classification Search
    CPC ............ F24D 19/1051; G05D 23/1333; G05D 23/134; G05D 23/1366; G05D 23/1373
    USPC .................. 236/12.11, 12.12, 21 R, 25 R
    See application file for complete search history.

(56) References Cited

U.S. PATENT DOCUMENTS

| | | | |
|---|---|---|---|
| 4,969,598 A | 11/1990 | Garris | |
| 6,024,290 A * | 2/2000 | Dosani | F24D 19/1051 165/132 |
| 7,316,267 B2 * | 1/2008 | Kunimoto | F24D 17/02 165/240 |
| 2012/0024968 A1 | 2/2012 | Beyerle et al. | |
| 2014/0020676 A1 | 1/2014 | Wehner | |
| 2014/0026970 A1 | 1/2014 | DuPlessis et al. | |

FOREIGN PATENT DOCUMENTS

WO    WO 2014/051268 A1    4/2014

* cited by examiner

*Primary Examiner* — Marc Norman
(74) *Attorney, Agent, or Firm* — Dority & Manning, P.A.

(57) ABSTRACT

Hot water heater systems and methods for controlling electronic mixing valves of hot water heater systems are disclosed. An electronic mixing valve provides a flow of water in a mixed output line. A method includes determining a temperature value inside a hot water tank of the hot water heater, and comparing the hot water tank temperature value to a setpoint temperature value. The method further includes comparing a temperature value for water in the mixed output line to a lower setpoint threshold value when the hot water tank temperature value is greater than the setpoint temperature value, wherein the lower setpoint threshold value is less than the setpoint temperature, and setting the electronic mixing valve to a safe position wherein the electronic mixing valve is less than fully open when the temperature value for water in the mixed output line is less than the lower setpoint threshold value.

20 Claims, 6 Drawing Sheets

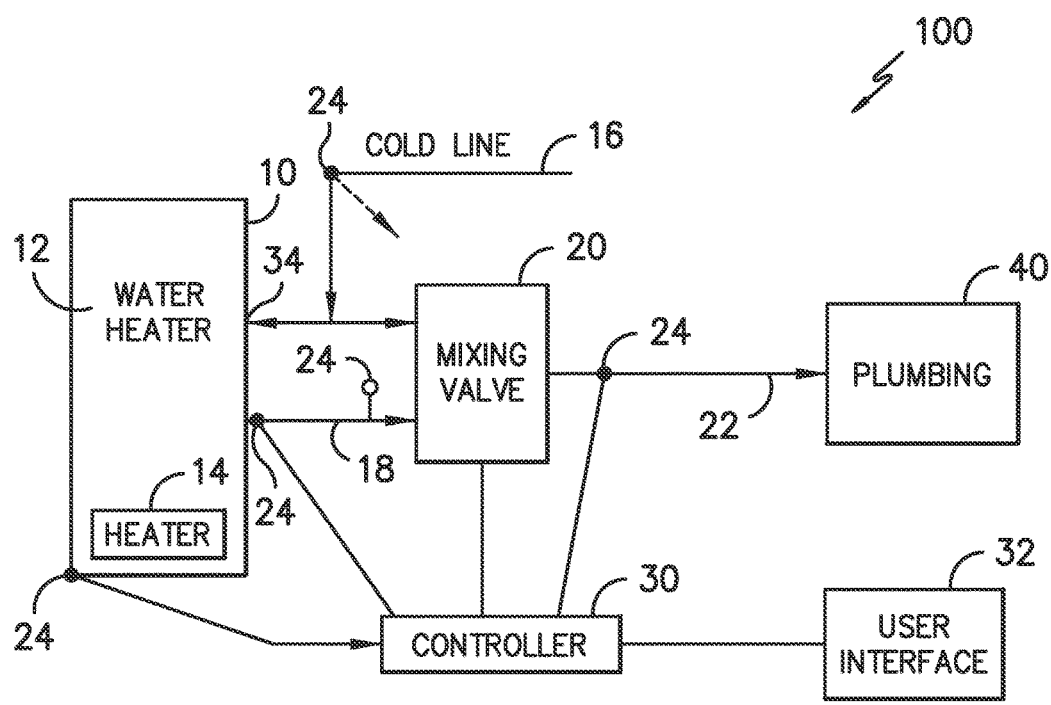
FIG. -1-

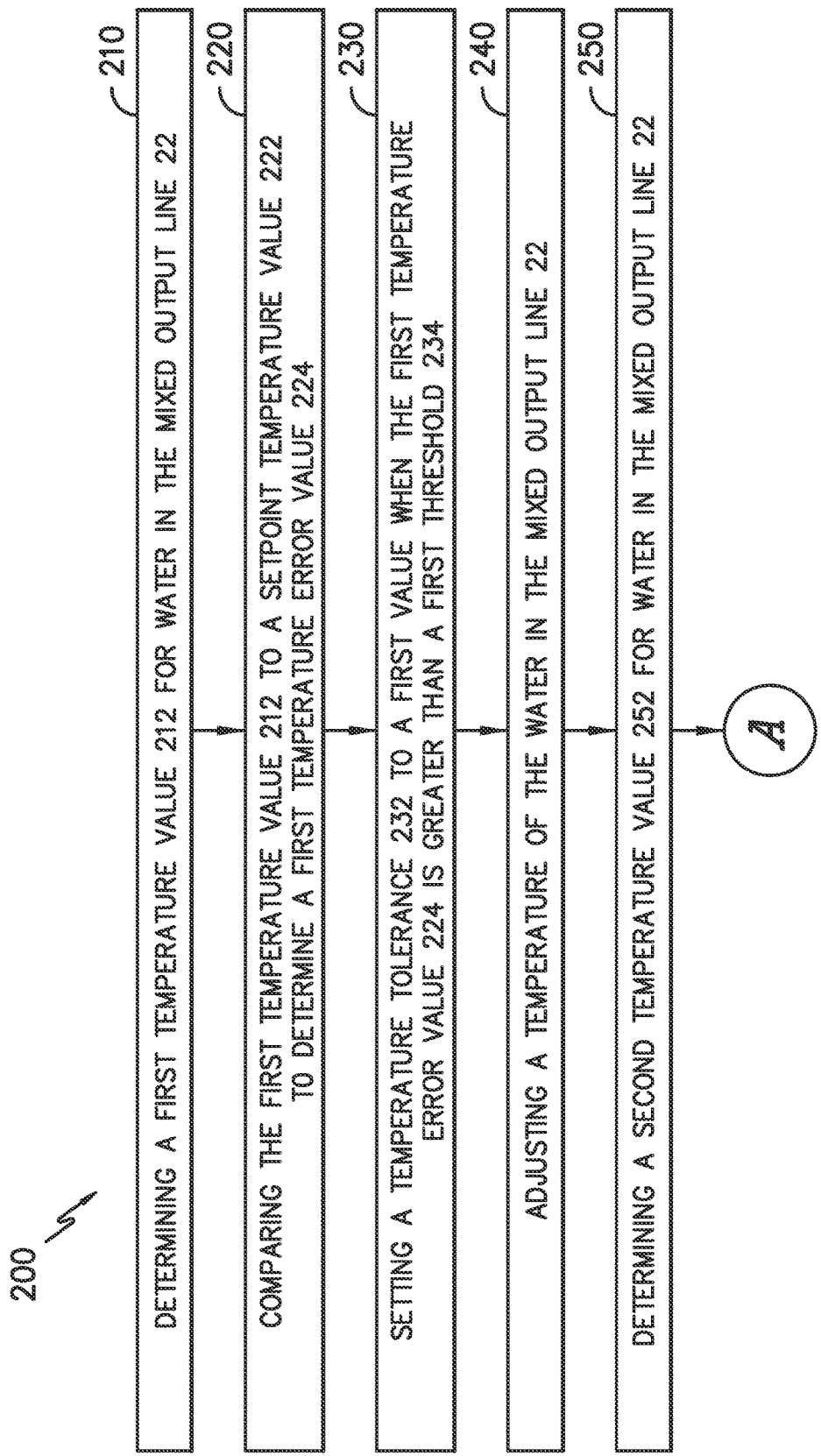

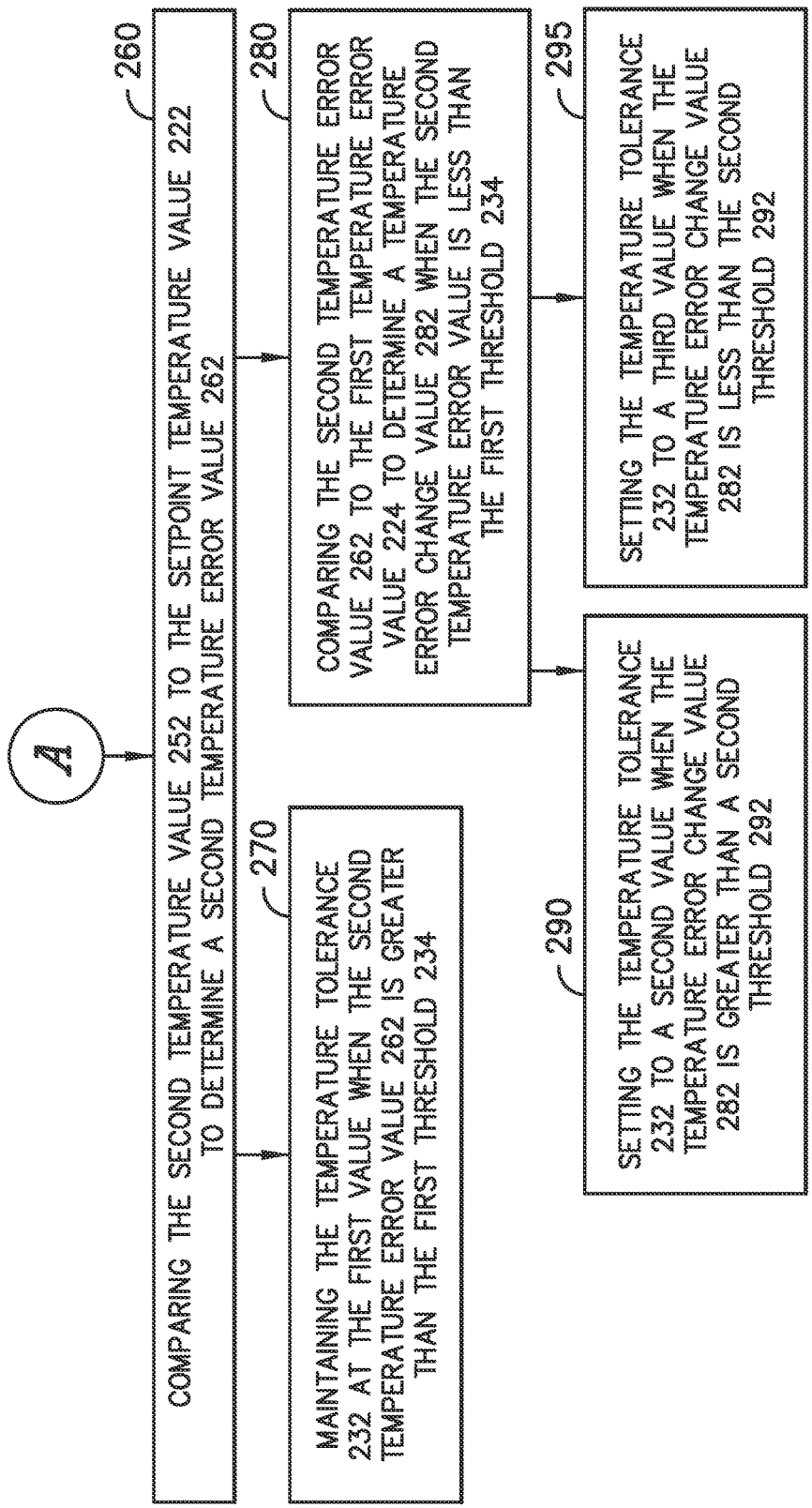
FIG. -2B-

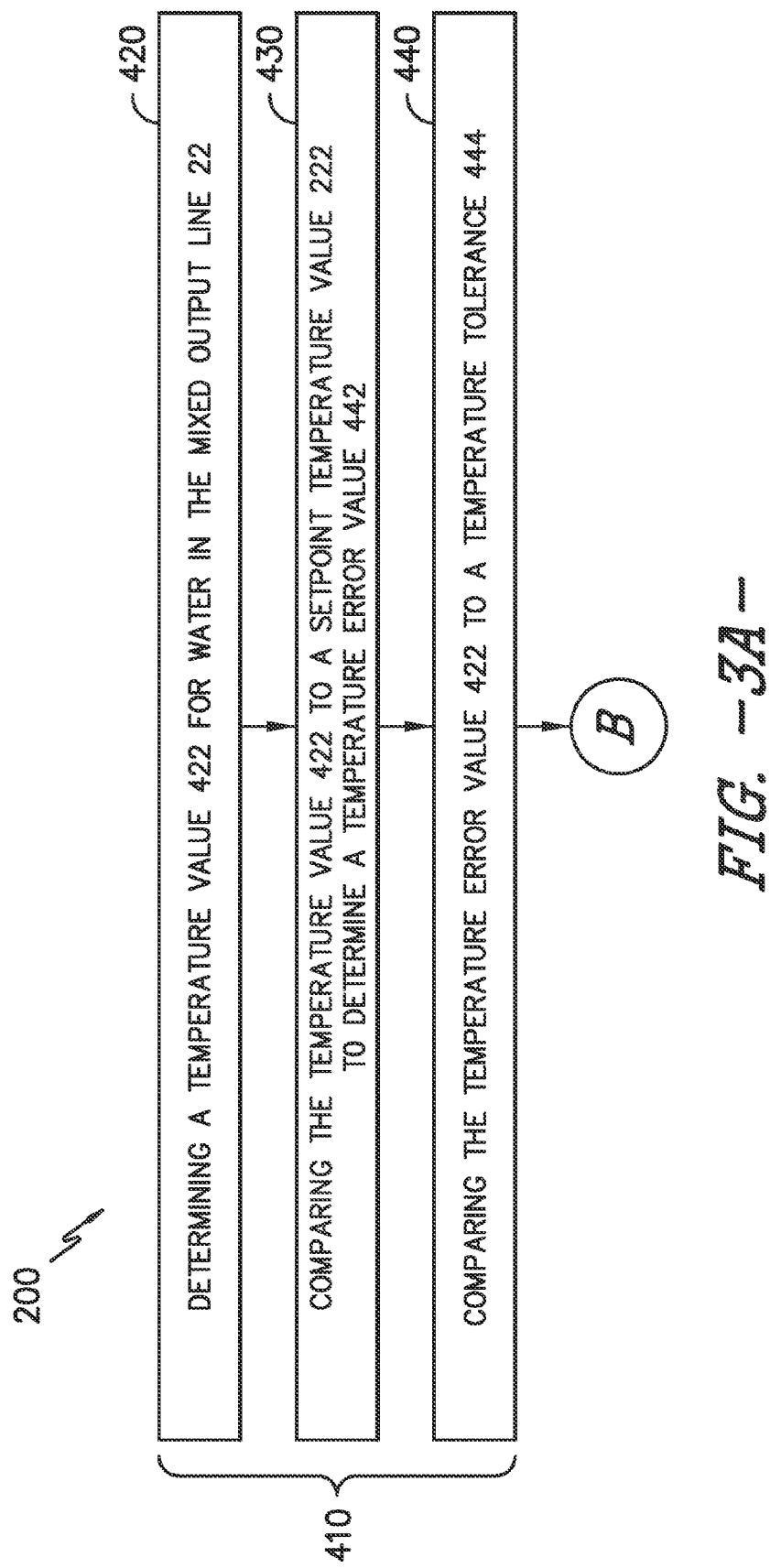
FIG. -3A-

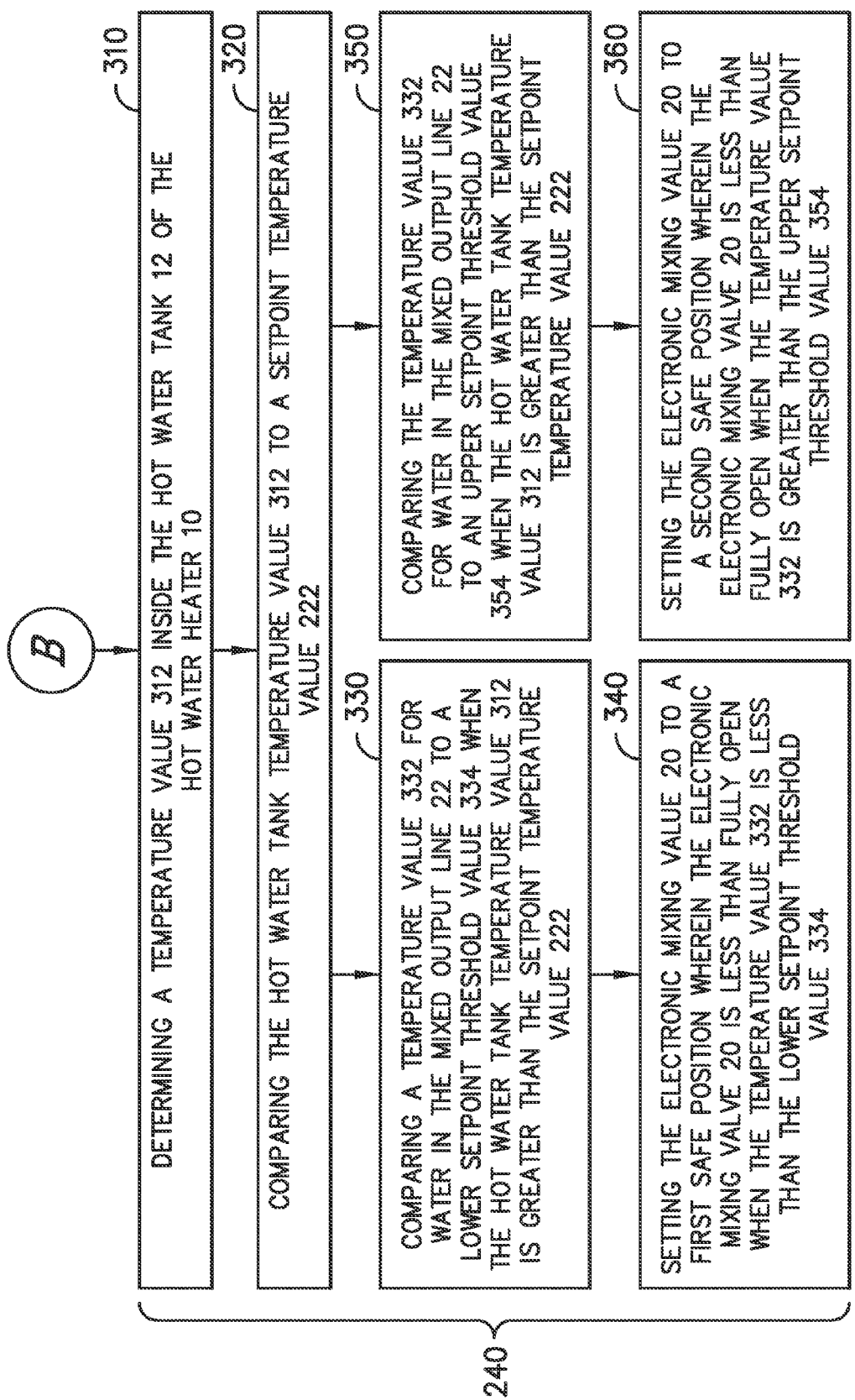
FIG. -3B-

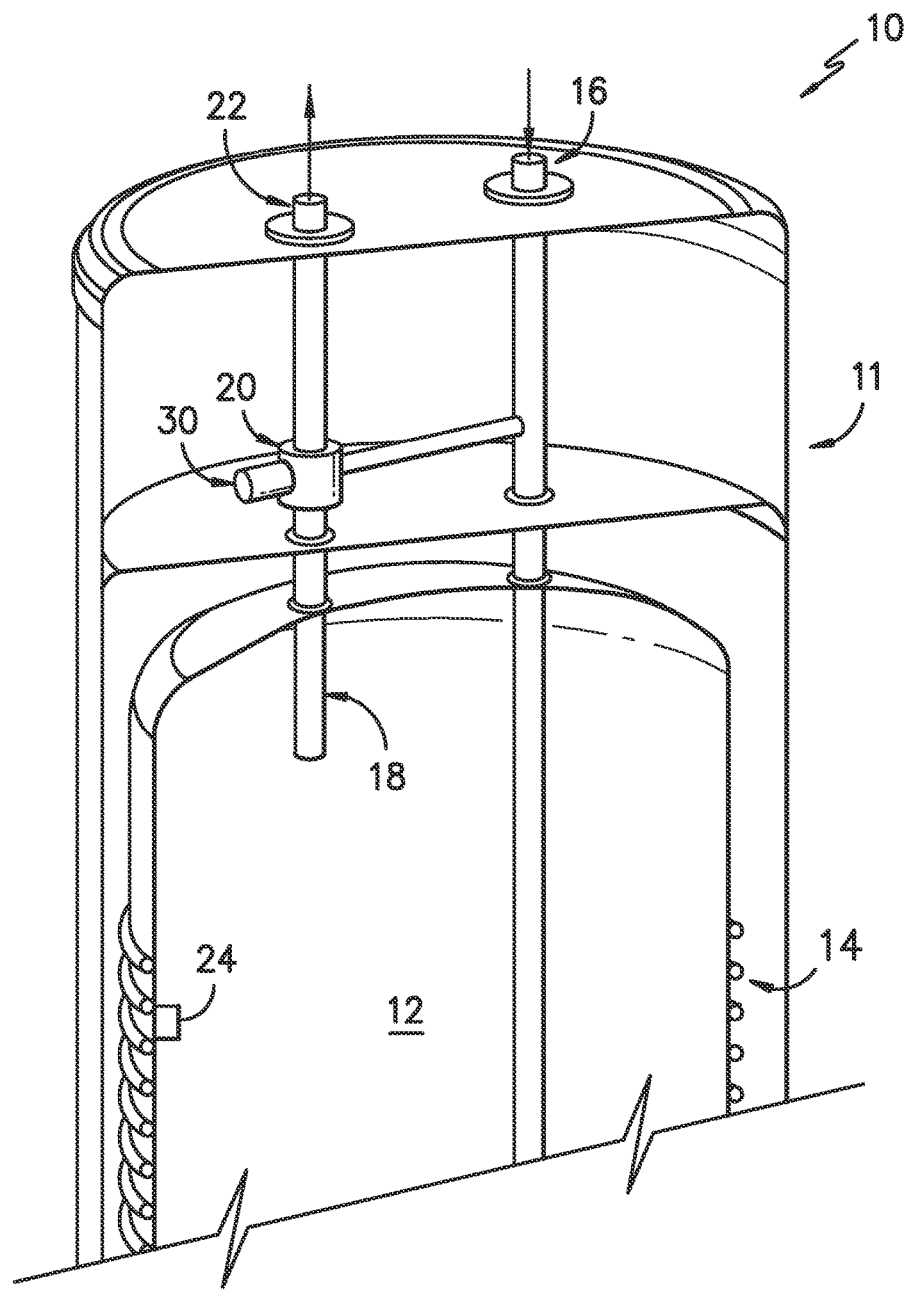
FIG. -4-

HOT WATER HEATER SYSTEMS AND METHODS FOR CONTROLLING ELECTRONIC MIXING VALVES

FIELD OF THE INVENTION

The present disclosure relates generally to hot water heater systems, and more particularly to methods for controlling electronic mixing valves of hot water heater systems.

BACKGROUND OF THE INVENTION

Mixing valves in hot water heater systems are generally used to increase the hot water capacity of hot water tanks of the hot water heaters. By increasing the temperature of the hot water in the hot water tank, and then mixing the hot water flow from the hot water tank with cold water in a mixing valve, the realized capacity of the hot water tank is increased.

U.S. Patent Application Publication No. 2014/0026970, filed Jan. 30, 2014, entitled "Electronic Mixing Valve in Standard Hot Water Heater", and which is incorporated by reference in its entirety herein, discloses electronic mixing valves for use in hot water heaters. Electronic mixing valves generally provide improved control over the temperature of the water delivered from associated hot water heaters relative to, for example, mechanical mixing valves.

However, improvements could be made to presently known methods for controlling such electronic mixing valves. For example, improvements to the response time for outputting a desired water temperature from a hot water heater that utilizes an electronic mixing valve could be advantageous. Many presently known electronic mixing valves are operated by controllers which utilize proportional, integral and derivative gains and temperature tolerances when controlling electronic mixing valves. Further, many such controllers currently utilize only one set of predefined variables, such as gains and/or tolerances, for all valve operations and requested temperature setpoints. In some cases, such as low flow rates or high temperature set points, the use of predefined variables can lead to these controllers and electronic mixing valves encountering unstable conditions and entering oscillatory states.

Further, many presently known hot water heaters which utilize electronic mixing valves can encounter hot water "spikes", when the electronic mixing valve is fully opened, which can lead to scalding, etc. The risk of such spikes can occur in situations wherein, for example, the hot water heater is "idle" for a period of time and the water encountered by a temperature sensor that measures output temperatures from the electronic mixing valve thus cools down. Additionally, in other situations, such hot water heaters can also encounter cold water "spikes".

Accordingly, improved hot water heater systems and methods for controlling electronic mixing valves are desired. In particular, improvements which reduce the risk of the electronic mixing valves encountering unstable conditions and entering oscillatory states would be advantageous. Further, improvements which reduce the risk of hot water and cold water "spikes" would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method for controlling an electronic mixing valve of a hot water heater system is disclosed. The electronic mixing valve provides a flow of water in a mixed output line. The method includes determining a first temperature value for water in the mixed output line, comparing the first temperature value to a setpoint temperature value to determine a first temperature error value, and setting a temperature tolerance to a first value when the first temperature error value is greater than a first threshold.

In accordance with another embodiment of the present disclosure, a hot water heater system is disclosed. The hot water heater system includes a hot water tank having a cold water inlet line and a hot water outlet line, and an electronic mixing valve fluid coupled to the cold water inlet line and the hot water outlet line. The hot water heater system further includes a mixed output line fluidly coupled to the electronic mixing valve, and a controller operatively coupled to the electronically controlled mixing valve. The controller is operable to determine a first temperature value for water in the mixed output line, compare the first temperature value to a setpoint temperature value to determine a first temperature error value, and set a temperature tolerance to a first value when the first temperature error value is greater than a first threshold.

In accordance with another embodiment of the present disclosure, a method for controlling an electronic mixing valve of a hot water heater system is disclosed. The electronic mixing valve provides a flow of water in a mixed output line. The method includes determining a temperature value inside a hot water tank of the hot water heater, and comparing the hot water tank temperature value to a setpoint temperature value. The method further includes comparing a temperature value for water in the mixed output line to a lower setpoint threshold value when the hot water tank temperature value is greater than the setpoint temperature value, wherein the lower setpoint threshold value is less than the setpoint temperature. The method further includes setting the electronic mixing valve to a safe position wherein the electronic mixing valve is less than fully open when the temperature value for water in the mixed output line is less than the lower setpoint threshold value.

In accordance with another embodiment of the present disclosure, a method for controlling an electronic mixing valve of a hot water heater system is disclosed. The electronic mixing valve provides a flow of water in a mixed output line. The method includes determining a temperature value inside a hot water tank of the hot water heater, and comparing the hot water tank temperature value to a setpoint temperature value. The method further includes comparing a temperature value for water in the mixed output line to an upper setpoint threshold value when the hot water tank temperature value is greater than the setpoint temperature value, wherein the upper setpoint threshold value is greater than the setpoint temperature. The method further includes setting the electronic mixing valve to a safe position wherein the electronic mixing valve is less than fully open when the temperature value for water in the mixed output line is greater than the upper setpoint threshold value.

In accordance with another embodiment of the present disclosure, a hot water heater system is disclosed. The hot water heater system includes a hot water tank having a cold water inlet line and a hot water outlet line, and an electronic mixing valve fluid coupled to the cold water inlet line and the hot water outlet line. The hot water heater system further includes a mixed output line fluidly coupled to the electronic mixing valve, and a controller operatively coupled to the electronically controlled mixing valve. The controller is operable to determine a temperature value inside the hot water tank, and compare the hot water tank temperature value to a setpoint temperature value. The controller is further operable to compare a temperature value for water in the mixed output line to a lower setpoint threshold value when the hot water tank temperature value is greater than the setpoint temperature value, wherein the lower setpoint threshold value is less than the setpoint temperature. The controller is further operable to set the electronic mixing valve to a safe position wherein the electronic mixing valve is less than fully open when the temperature value for water in the mixed output line is less than the lower setpoint threshold value.

In accordance with another embodiment of the present disclosure, a hot water heater system is disclosed. The hot water heater system includes a hot water tank having a cold water inlet line and a hot water outlet line, and an electronic mixing valve fluid coupled to the cold water inlet line and the hot water outlet line. The hot water heater system further includes a mixed output line fluidly coupled to the electronic mixing valve, and a controller operatively coupled to the electronically controlled mixing valve. The controller is operable to determine a temperature value inside the hot water tank, and compare the hot water tank temperature value to a setpoint temperature value. The controller is further operable to compare a temperature value for water in the mixed output line to an upper setpoint threshold value when the hot water tank temperature value is greater than the setpoint temperature value, wherein the upper setpoint threshold value is greater than the setpoint temperature. The controller is further operable to set the electronic mixing valve to a safe position wherein the electronic mixing valve is less than fully open when the temperature value for water in the mixed output line is greater than the upper setpoint threshold value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic view of a hot water heater system 100 in accordance with one embodiment of the present disclosure;

FIGS. 2A and 2B are a flow chart illustrating a method for controlling an electronic mixing valve for a hot water heater in accordance with one embodiment of the present disclosure; and FIGS. 3A and 3B are a flow chart illustrating a method for controlling an electronic mixing valve for a hot water heater in accordance with another embodiment of the present disclosure; and FIG. 4 is a perspective view of a hot water heater and hot water heater system in accordance with one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to FIGS. 1 and 4, an exemplary hot water heater system 100 and hot water heater 10 therefor are provided. As shown, the hot water heater system 100 generally includes hot water heater 10, an electronic mixing valve 20 and a controller 30. In the embodiment of FIGS. 1 and 4, the hot water heater 10 includes a reservoir or water storage tank 12 for storing water and a heat source 14 for heating the water stored in the tank 12. The tank 12 and heat source 14 are generally housed within a casing 11 of the hot water heater 10. In exemplary embodiments, the hot water heater 10 is a heat pump water heater, and the heat source 14 is thus a heat pump heating element. It should be understood, however, that the present disclosure is not limited to heat pump water heaters, and rather that any suitable water heaters may be utilized. Further, any suitable heat sources 14, including gas burners, heat pumps, electric resistance elements, microwave elements, induction elements, or any other suitable heating element or combinations thereof, may be utilized. The hot water heater system 10 includes an inlet 34 for receiving water from inlet line 16 for delivery into the tank 12. The water in the inlet line 16 is typically described as non-heated or "cold" water. The inlet line 16 is typically part of or connected to a water supply line for a home or building. The hot water heater system 10 also includes an outlet line 18 for supplying water from the tank 12 that has been heated to a pre-determined temperature, generally referred to herein as hot water. In the embodiment shown in FIGS. 1 and 4, the outlet line 18 is coupled to the mixing valve 20. The mixing valve 20 receives non-heated water from the inlet line 16 and heated water from the outlet line 18 and mixes the heated water with the non-heated water to reduce the temperature of the water from the mixing valve 20 that is delivered to the plumbing system 40. The mixing valve 20 includes a mixed outlet or output line 22 that delivers the heated water resulting from the mixing to the portions of the plumbing system 40 to which the hot water heater 10 is connected, generally referred to herein as the hot water portions of the hot water system. The plumbing system 40 can be part of a residential, commercial or other water plumbing system that incorporates a hot water heater.

As shown in FIGS. 1 and 4, in these embodiments, the mixing valve 20 is fluidly connected to the inlet line 16 and the outlet line 18. The mixing valve 20 is coupled to the plumbing system 40 via the mixed output line 22. In one embodiment, the mixing valve 20 is an electronically controlled mixing valve and can include for example, a solenoid operated water valve and a gear or motor driven water valve. In alternate embodiments, any suitably controlled water mixing valve can be utilized to provide precise flow control such as for example, a servo or stepper motor coupled with a valve.

In exemplary embodiments, the mixing valve is disposed within the casing 11, as shown in FIG. 4. Alternatively, however, the mixing valve may be external to the hot water heater 10.

In the embodiment shown in FIGS. 1 and 4, the controller 30 is an electronic controller that is operatively coupled to the hot water heater 10 and the mixing valve 20. Controller 30 can include or be operatively coupled to, or be in communication with, one or more processor(s) that are operable to monitor and control the flow of hot water from the hot water tank 12 and heated water from the mixing valve 20, as well as execute the processes that are generally described herein. In one embodiment the controller 30 can include or receive machine-readable instructions that are executable by one or more processors or other suitable processing device(s). The processor(s) can include program code to perform particular tasks and/or data manipulations, as are generally described herein. In one embodiment, the processor(s) can include or be coupled to a memory and input/output devices. The memory typically includes both non-volatile memory, such as semiconductor type random access memory, and non-volatile memory such as a magnetic computer disk.

In one embodiment, the controller 30 is operatively coupled to and between, and is communication with, the hot water heater 10 and the mixing valve 20. The controller 30 can also include or be coupled to a user interface 32. In one embodiment, the controller 30 and user interface 32 form part of a home energy management (HEM) system. The user interface 32 can comprise any suitable control or display that will allow a user to program, set and adjust the functions and settings of the hot water heater system 100, as are generally described herein. In one embodiment, the user interface 32 comprises a display interface, such as a touch screen display. In alternate embodiments, the user interface 32 can include buttons or switches for manipulating and programming the settings of the system 100, including for example the setpoint temperature. In one embodiment, the user interface 32 comprises or is part of a control panel for the hot water heater 10. The user interface 32 can also be located remotely from the hot water heater 10, and can be accessible through a computing device or a web based interface.

As is illustrated in FIGS. 1 and 4, in one embodiment, the system 100 includes one or more temperature sensors 24 for detecting and monitoring the temperature of the water in the different portions of the system 100. In the example of FIG. 1, sensors 24, such as thermistors, are shown on or thermally coupled to one or more of the inlet line 16, the outlet line 18, the mixed output line 22 and the hot water tank 12. The sensor(s) 24 are generally configured to provide one or more signals or commands to the controller 30 that will allow the controller 30 to detect and determine temperature values for the water in various portions of the hot water system 100.

In one embodiment, the sensors 24 are coupled to the controller 30 via a wired or wireless communication connection or interface. For purposes of the description herein, wireless communication connections and interfaces can include, but are not limited to, wireless radio, WiFi, Bluetooth, Zigbee and ethernet wireless type devices and interfaces.

Referring now to FIGS. 2A-2B and 3A-3B, various embodiments of methods for controlling electronic mixing valves 20 for hot water heater systems 100 are provided. In general, such methods provide improved operation of controllers 30, electronic mixing valves 20, and systems 100 in general. For example, such methods may reduce the risk of electronic mixing valves 20 encountering unstable conditions and entering oscillatory states. Further, such methods may reduce the risk of hot water and cold water "spikes".

It should be noted that controllers 30 as disclosed herein are capable of and may be operable to perform any methods and associated method steps as disclosed herein.

For example, referring to FIGS. 2A and 2B, a method 200 for controlling an electronic mixing valve 20 for a hot water heater system 100 may include, for example, the step 210 of determining a first temperature value 212 for water in the mixed output line 22. For example, as discussed, a temperature sensor 24 may be operatively coupled to the mixed output line 22 and the controller 30. Temperature sensor 24 may transmit signals to the controller 30 to determine the temperature of the water in the mixed output line 22. Accordingly, the first temperature value 212 may be determined based on signals received from the temperature sensor 24. Alternatively, any suitable methods or apparatus may be utilized to determine the first temperature value 212.

Method 200 may further include, for example, the step 220 of comparing the first temperature value 212 to a setpoint temperature value 222 to determine a first temperature error value 224. The setpoint temperature value 222 may be the value selected by a user for desired water output temperature within the mixed output line 22. For example, a user may select the setpoint temperature value 222 through use of the user interface 32. In general, when a setpoint temperature value 222 is selected, the controller 30 and electronic mixing valve 20 may react to adjust the electronic mixing valve 20 such that the actual temperature of water within the mixed output line 22 is within a particular tolerance level of the setpoint temperature value 222.

In exemplary embodiments, comparing the first temperature value 212 to the setpoint temperature value 222 to determine the first temperature error value 224 includes subtracting the first temperature value 212 from the setpoint temperature value 222. Further, the absolute value of the resulting value may be taken. The resulting first temperature error value 224 is thus in these embodiments the difference between the first temperature value 212 and the setpoint temperature value 222.

Method 200 may further include, for example, the step 230 of setting a temperature tolerance 232 to a first value when the first temperature error value 224 is greater than (or in some embodiments equal to) a first threshold 234. The first threshold 234 is, for example, a predetermined value which typically corresponds to a relatively large difference between the first temperature value 212 and the setpoint temperature value 222. If the first temperature error value 224 is greater than (or in some embodiments equal to) the first threshold 234, a temperature tolerance 232 is set to a first value. The first value is typically also relative high, thus allowing for relatively high tolerances to be utilized, such as by the controller 30, when initially adjusting the temperature of the water in the mixed output line 22 (such as via adjustments to the electronic mixing valve 20).

Notably, in exemplary embodiments, when the first temperature error value 224 is less than (or in some embodiments equal to) the first threshold 234, no adjustment is made to the presently stored temperature tolerance 232.

Method 200 may further include, for example, the step 240 of adjusting a temperature of the water in the mixed output line 22. Such step may occur, for example, after the comparing step 220 and optional setting step 230. Any suitable methods or apparatus may be utilized to adjust the temperature of the water in the mixed output line 22. Typically, controller 30 may provide inputs to the electronic mixing valve 20 to cause the mixing valve 20 to adjust the water input levels from the inlet line 16 and outlet line 18, thus adjusting the ratio of hot water and cold water and the resulting water temperature in mixed output line 22. The algorithms utilized by controller 30 may, for example, utilize a temperature tolerance such as temperature tolerance 232, as is generally understood.

Method 200 may further include, for example, the step 250 of determining a second temperature value 252 for water in the mixed output line 22. In exemplary embodiments, such step 250 may occur after the step 240 of adjusting the water temperature in the mixed output line 22. Further, such step 250 may be performed in a manner similar to step 210. For example, as discussed, a temperature sensor 24 may be operatively coupled to the mixed output line 22 and the controller 30. Temperature sensor 24 may transmit signals to the controller 30 to determine the temperature of the water in the mixed output line 22. Accordingly, the second temperature value 252 may be determined based on signals received from the temperature sensor 24. Alternatively, any suitable methods or apparatus may be utilized to determine the second temperature value 252.

Method 200 may further include the step 260 of comparing the second temperature value 252 to the setpoint temperature value 222 to determine a second temperature error value 262. In exemplary embodiments, comparing the second temperature value 252 to the setpoint temperature value 222 to determine the second temperature error value 262 includes subtracting the second temperature value 252 from the setpoint temperature value 222. Further, the absolute value of the resulting value may be taken. The resulting second temperature error value 262 is thus in these embodiments the difference between the second temperature value 252 and the setpoint temperature value 222.

Method 200 may further include, for example, the step 270 of maintaining the temperature tolerance 232 at the first value when the second temperature error value 262 is greater than (or in some embodiments equal to) the first threshold 234. Notably, after step 270 occurs, the temperature of the water in the mixed output line 22 may again be adjusted (as discussed above with respect to step 240), and the various subsequent steps may be repeated.

Method 200 may further include, for example, the step 280 of comparing the second temperature error value 262 to the first temperature error value 224 to determine a temperature error change value 282 when the second temperature error value is less than (or in some embodiments equal to) the first threshold 234. In exemplary embodiments, comparing the second temperature error value 262 to the first temperature error value 224 to determine a temperature error change value 282 includes subtracting the first temperature error value 224 from the second temperature error value 262. Further, the absolute value of the resulting value may be taken. The resulting temperature error change value 282 is thus in these embodiments the difference between the first temperature error value 224 and the second temperature error value 262, and thus provides an indication of the significance of the water temperature change in the mixed output line 22 relative to the setpoint temperature value 222.

Method 200 may further include, for example, the step 290 of setting the temperature tolerance 232 to a second value when the temperature error change value 282 is greater than (or in some embodiments equal to) a second threshold 292. The second threshold 292 is, for example, a predetermined value which corresponds to a certain difference between the first temperature error value 224 and the second temperature error value 262. If the temperature error change value 282 is greater than (or in some embodiments equal to) the second threshold 292, the temperature tolerance 232 is set to the second value. In some embodiments, the second value is identical to the first value. In other embodiments, however, the second value is different from the first value. For example, in exemplary embodiments, the second value is less than the first value (thus tightening the tolerance utilized by the controller 30 when adjusting the electronic mixing valve 20). Alternatively, however, the second value may be greater than the first value.

Method 200 may further include, for example, the step 295 of setting the temperature tolerance 232 to a third value when the temperature error change value 282 is less than (or in some embodiments equal to) the second threshold 292. Accordingly, if the temperature error change value 282 is less than (or in some embodiments equal to) the second threshold 292, the temperature tolerance 232 is set to the third value. The third value is different from the second value, and may be the same or different from the first value. In exemplary embodiments, the third value is less than the second value and the first value, although in alternative embodiments, the third value may be greater than the first value and/or the second value.

Notably, after step 290 or 295 occurs, the temperature of the water in the mixed output line 22 may again be adjusted (as discussed above with respect to step 240), and the various subsequent steps may be repeated.

In exemplary embodiments, the third value is less than the second value and the first value, and the second value is greater than the first value. Accordingly, the present disclosure in exemplary embodiments utilizes relatively large tolerances when the temperature differentials from the setpoint temperature value 222 are relatively large, and then reduces the tolerance levels as the temperature differentials are reduced. These tolerances in exemplary embodiments are utilized by the controller 30 to operate the electronic mixing valve 20 as discussed herein. Such use of varying tolerances based on relative temperatures can advantageously reduce the risk of controllers 30 and electronic mixing valves 20 encountering unstable conditions and entering oscillatory states.

Referring now to FIGS. 3A and 3B, methods 200 for controlling an electronic mixing valve 20 for a hot water heater system 100 in accordance with other embodiments of the present disclosure are provided. The steps of such methods may be utilized in addition to or separate from the method steps 200 discussed above in accordance with FIGS. 2A and 2B. In particular, method steps as discussed in accordance with FIGS. 3A and 3B may in some embodiments be considered sub-steps of step 240 of adjusting a temperature of the water in the mixed output line 22, and may thus be utilized for example, when operating the electronic mixing valve 20 to adjust the mixed output line 22 water temperature.

Method 200 (or step 240 thereof) may thus include the step 310 of determining a temperature value 312 inside the hot water tank 12 of the hot water heater 10. For example, as discussed, a temperature sensor 24 may be operatively coupled to the hot water tank 12 and the controller 30. Temperature sensor 24 may transmit signals to the controller 30 to determine the temperature of the water in the hot water tank 12. Accordingly, the temperature value 312 may be determined based on signals received from the temperature sensor 24. Alternatively, any suitable methods or apparatus may be utilized to determine the temperature value 312.

Method 200 (or step 240 thereof) may further include, for example, the step 320 of comparing the hot water tank temperature value 312 to a setpoint temperature value, such as setpoint temperature value 222. In exemplary embodiments, comparing the hot water tank temperature value 312 to the setpoint temperature value 222 includes determining whether the hot water tank temperature value 312 is greater than (or in some embodiments equal to) the setpoint temperature value 222 or less than (or in some embodiments equal to) the setpoint temperature value 222.

Notably, in exemplary embodiments, when the hot water tank temperature value 312 is less than (or in some embodiments equal to) the setpoint temperature value 222, an adjustment to the electronic mixing valve 20 may be made in accordance with any suitable steps, algorithm, etc. as is generally understood in the art.

Method 200 (or step 240 thereof) may further include, for example, the step 330 of comparing a temperature value 332 for water in the mixed output line 22 to a lower setpoint threshold value 334 when the hot water tank temperature value 312 is greater than (or in some embodiments equal to) the setpoint temperature value 222. Notably, the temperature value 332 could be first temperature value 212, second temperature value 252, or other measurement of the temperature of the water in the mixed output line 22 in accordance with the present method 200. In exemplary embodiments, such temperature values may be received in real time from corresponding temperature sensors 24 for use in accordance with the present method.

The lower setpoint threshold value 334 is, for example, a predetermined temperature value which is less than setpoint temperature value 222, such as for example 5, 10, 15 or 20 degrees less than the setpoint temperature value 222. If the hot water tank temperature value 312 is greater than (or in some embodiments equal to) the setpoint temperature value 222, the temperature value 332 for water in the mixed output line 22 is thus compared to the lower setpoint threshold value 334. In exemplary embodiments, comparing the temperature value 332 to the lower setpoint threshold value 334 includes determining whether the temperature value 332 is greater than (or in some embodiments equal to) the lower setpoint threshold value 334 or less than (or in some embodiments equal to) the lower setpoint threshold value 334.

Method 200 (or step 240 thereof) may further include, for example, the step 340 of setting the electronic mixing valve 20 to a first safe position wherein the electronic mixing valve 20 is less than fully open when the temperature value 332 is less than (or in some embodiments equal to) the lower setpoint threshold value 334. It is generally understood that the fully open position for an electronic mixing valve 20 is a position wherein the maximum amount of hot water is allowed to flow through the electronic mixing valve 20. Accordingly, the first safe position is a position wherein the electronic mixing valve 20 is less than fully open and less than the maximum amount of hot water is allowed to flow through the electronic mixing valve 20.

As a result of step 240, hot water "spikes" may be reduced. When the temperature value 332 is less than the lower setpoint threshold value 334, the temperature value 332 is thus further (and typically significantly further) less than the setpoint temperature value 222. In many cases, previously known algorithms and methods would, based on these temperature disparities, automatically adjust the electronic mixing valve 20 to fully open. This could, as discussed above, potentially lead to scalding and other undesirable results. The present disclosure advantageously prevents such hot water "spikes" and associated results in such situations.

Notably, in some embodiments when the temperature value 332 is greater than (or in some embodiments equal to) the lower setpoint threshold value 334, an adjustment to the electronic mixing valve 20 may be made in accordance with any suitable steps, algorithm, etc. as is generally understood in the art. In other embodiments, the method may continue to step 350 as discussed below.

Method 200 (or step 240 thereof) may further include, for example, the step 350 of comparing the temperature value 332 for water in the mixed output line 22 to an upper setpoint threshold value 354 when the hot water tank temperature value 312 is greater than (or in some embodiments equal to) the setpoint temperature value 222. The upper setpoint threshold value 354 is, for example, a predetermined temperature value which is greater than setpoint temperature value 222, such as for example 5, 10, 15 or 20 degrees greater than the setpoint temperature value 222. If the hot water tank temperature value 312 is greater than (or in some embodiments equal to) the setpoint temperature value 222, the temperature value 332 for water in the mixed output line 22 is thus compared to the upper setpoint threshold value 354. In exemplary embodiments, comparing the temperature value 332 to the upper setpoint threshold value 354 includes determining whether the temperature value 332 is greater than (or in some embodiments equal to) the upper setpoint threshold value 354 or less than (or in some embodiments equal to) the upper setpoint threshold value 354.

Method 200 (or step 240 thereof) may further include, for example, the step 360 of setting the electronic mixing valve 20 to a second safe position wherein the electronic mixing valve 20 is less than fully open when the temperature value 332 is greater than (or in some embodiments equal to) the upper setpoint threshold value 354. It is generally understood that the fully open position for an electronic mixing valve 20 is a position wherein the maximum amount of hot water is allowed to flow through the electronic mixing valve 20. Accordingly, the second safe position is a position wherein the electronic mixing valve 20 is less than fully open and less than the maximum amount of hot water is allowed to flow through the electronic mixing valve 20. Notably, in some embodiments, the second safe position may be less open than the first safe position, although in alternative embodiments the positions may be identical or the first safe position may be less open than the second safe position.

As a result of step 360, cold water "spikes" may be reduced. When the temperature value 332 is greater than the upper setpoint threshold value 354, the temperature value 332 is thus further (and typically significantly further) greater than the setpoint temperature value 222. In many cases, previously known algorithms and methods would, based on these temperature disparities, automatically adjust the electronic mixing valve 20 to fully closed. This could, as discussed above, potentially lead to the user receiving only cold water, which could be uncomfortable and undesirable. The present disclosure advantageously prevents such cold water "spikes" and associated results in such situations.

In some embodiments, steps 350 and 360 occur after when the temperature value 322 is greater than the lower setpoint threshold value 334, and thus after step 340 occurs. Alternatively, steps 350 and 360 (and subsequent steps) may occur independently of steps 330 and 340, or before or simultaneously with such steps. Further, in some embodiments when the temperature value 332 is less than (or in some embodiments equal to) the upper setpoint threshold value 354, an adjustment to the electronic mixing valve 20 may be made in accordance with any suitable steps, algorithm, etc. as is generally understood in the art. In other embodiments, the method may continue to step 330 as discussed above.

As discussed herein, method 200 may include the step 240 of adjusting a temperature of the water in the mixed output line 22. In exemplary embodiments, such method 200 may further include various steps for determining whether the temperature of the water in the mixed output line 22 requires adjustment. For example, in some embodiments, method 200 may include the step 410 of determining whether a temperature of the water in the mixed output line 22 requires adjustment. In these embodiments, steps such as step 310 may occur when the temperature of the water in the mixed output line 22 requires adjustment, and may not occur when the temperature of the water in the mixed output line 22 does not require adjustment.

Step 410 may include, for example, the step 440 of comparing a temperature error value 422, such as first temperature error value 224 or second temperature error value 262, to a temperature tolerance 444, such as temperature tolerance 232. In these embodiments, the temperature of the water in the mixed output line 22 requires adjustment when the temperature error value 422 is greater than (or in some embodiments equal to) the temperature tolerance 444, and does not require adjustment when the temperature error value 422 is less than (or in some embodiments equal to) the temperature tolerance 444.

In order to utilize temperature error value 422 for step 440, this value 422 must first be obtained. Accordingly, step 410 may further include, for example, the step 420 of determining a temperature value 422 for water in the mixed output line 22. For example, as discussed, a temperature sensor 24 may be operatively coupled to the mixed output line 22 and the controller 30. Temperature sensor 24 may transmit signals to the controller 30 to determine the temperature of the water in the mixed output line 22. Accordingly, the temperature value 422 may be determined based on signals received from the temperature sensor 24. Alternatively, any suitable methods or apparatus may be utilized to determine the temperature value 422.

Step 410 may further include, for example, the step 430 of comparing the temperature value 422 to a setpoint temperature value, such as setpoint temperature value 222, to determine the temperature error value 442. In exemplary embodiments, comparing the temperature error value 442 to the setpoint temperature value 222 to determine the temperature error value 442 includes subtracting the temperature value 422 from the setpoint temperature value 222. Further, the absolute value of the resulting value may be taken. The resulting temperature error value 442 is thus in these embodiments the difference between the temperature value 422 and the setpoint temperature value 222.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an electronic mixing valve for a hot water heater, the electronic mixing valve providing a flow of water in a mixed output line, the method comprising:
   determining a temperature value inside a hot water tank of the hot water heater;
   comparing the hot water tank temperature value to a setpoint temperature value; and
   comparing a temperature value for water in the mixed output line to a lower setpoint threshold value when the hot water tank temperature value is greater than the setpoint temperature value, wherein the lower setpoint threshold value is less than the setpoint temperature; and
   setting the electronic mixing valve to a safe position wherein the electronic mixing valve is less than fully open when the temperature value for water in the mixed output line is less than the lower setpoint threshold value.

2. The method of claim 1, wherein the safe position is a first safe position, and further comprising:
   comparing the temperature value for water in the mixed output line to an upper setpoint threshold value when the hot water tank temperature value is greater than the setpoint temperature value, wherein the upper setpoint threshold value is greater than the setpoint temperature; and
   setting the electronic mixing valve to a second safe position wherein the electronic mixing valve is less than fully open when the temperature value for water in the mixed output line is greater than the upper setpoint threshold value.

3. The method of claim 2, wherein comparing the temperature value for water in the mixed output line to the upper setpoint threshold value occurs when the temperature value for water in the mixed output line is greater than the lower setpoint threshold value.

4. The method of claim 2, wherein the second safe position is less open than the first safe position.

5. The method of claim 1, further comprising determining whether a temperature of the water in the mixed output line requires adjustment, and
   wherein determining the temperature value inside the hot water tank occurs when the temperature of the water in the mixed output line requires adjustment.

6. The method of claim 5, wherein determining whether the temperature of the water in the mixed output line requires adjustment comprises comparing a temperature error value to a temperature tolerance, and wherein the temperature of the water in the mixed output line requires adjustment when the temperature error value is greater than the temperature tolerance.

7. The method of claim 6, further comprising:
   determining the temperature value for water in the mixed output line; and
   comparing the temperature value for water in the mixed output line to the setpoint temperature to determine the temperature error value.

8. A method for controlling an electronic mixing valve for a hot water heater, the electronic mixing valve providing a flow of water in a mixed output line, the method comprising:
   determining a temperature value inside a hot water tank of the hot water heater;
   comparing the hot water tank temperature value to a setpoint temperature value; and
   comparing a temperature value for water in the mixed output line to an upper setpoint threshold value when the hot water tank temperature value is greater than the setpoint temperature value, wherein the upper setpoint threshold value is greater than the setpoint temperature; and
   setting the electronic mixing valve to a safe position wherein the electronic mixing valve is less than fully open when the temperature value for water in the mixed output line is greater than the upper setpoint threshold value.

9. The method of claim 8, further comprising determining whether a temperature of the water in the mixed output line requires adjustment, and
   wherein determining the temperature value inside the tank of the hot water heater occurs when the temperature of the water in the mixed output line requires adjustment.

10. A hot water heater system, comprising:
   a hot water tank having a cold water inlet line and a hot water outlet line;
   an electronic mixing valve fluid coupled to the cold water inlet line and the hot water outlet line;
   a mixed output line fluidly coupled to the electronic mixing valve; and
   a controller operatively coupled to the electronically controlled mixing valve and operable to:
      determine a temperature value inside the hot water tank;
      compare the hot water tank temperature value to a setpoint temperature value; and
      compare a temperature value for water in the mixed output line to a lower setpoint threshold value when the hot water tank temperature value is greater than the setpoint temperature value, wherein the lower setpoint threshold value is less than the setpoint temperature; and
      set the electronic mixing valve to a safe position wherein the electronic mixing valve is less than fully open when the temperature value for water in the mixed output line is less than the lower setpoint threshold value.

11. The hot water heater system of claim 10, wherein the safe position is a first safe position, and wherein the controller is further operable to:
   compare the temperature value for water in the mixed output line to an upper setpoint threshold value when the hot water tank temperature value is greater than the setpoint temperature value, wherein the upper setpoint threshold value is greater than the setpoint temperature; and
   set the electronic mixing valve to a second safe position wherein the electronic mixing valve is less than fully open when the temperature value for water in the mixed output line is greater than the upper setpoint threshold value.

12. The hot water heater system of claim 11, wherein comparing the temperature value for water in the mixed output line to the upper setpoint threshold value occurs when the temperature value for water in the mixed output line is greater than the lower setpoint threshold value.

13. The hot water heater system of claim 11, wherein the second safe position is less open than the first safe position.

14. The hot water heater system of claim 10, wherein the controller is further operable to determine whether a temperature of the water in the mixed output line requires adjustment, and
   wherein determining the temperature value inside the hot water tank of the hot water heater occurs when the temperature of the water in the mixed output line requires adjustment.

15. The hot water heater system of claim 14, wherein determining whether the temperature of the water in the mixed output line requires adjustment comprises comparing a temperature error value to a temperature tolerance, and wherein the temperature of the water in the mixed output line requires adjustment when the temperature error value is greater than the temperature tolerance.

16. The hot water heater system of claim 15, wherein the controller is further operable to:
   determine the temperature value for water in the mixed output line; and
   compare the temperature value for water in the mixed output line to the setpoint temperature to determine the temperature error value.

17. The hot water heater system of claim 10, further comprising a temperature sensor operatively coupled to the mixed output line and the controller, and wherein the temperature value for water in the mixed output line is determined based on signals received from the temperature sensor.

18. The hot water heater system of claim 17, wherein the temperature sensor is a thermistor.

19. The hot water heater system of claim 10, further comprising a temperature sensor operatively coupled to the hot water tank and the controller, and wherein the hot water tank temperature value is determined based on signals received from the temperature sensor.

20. The hot water heater system of claim 19, wherein the temperature sensor is a thermistor.

* * * * *